US011593749B2

(12) United States Patent
Millhouse et al.

(10) Patent No.: US 11,593,749 B2
(45) Date of Patent: *Feb. 28, 2023

(54) SHIPMENT VERIFICATION

(71) Applicant: Walmart Apollo, LLC, Bentonville, AR (US)

(72) Inventors: Andrew B. Millhouse, Gilbert, AZ (US); Timothy J. Burleson, Bentonville, AR (US); John S. Meredith, Bentonville, AR (US); Todd D. Mattingly, Bentonville, AR (US)

(73) Assignee: Walmart Apollo. LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,893

(22) Filed: Sep. 28, 2021

(65) Prior Publication Data

US 2022/0019966 A1  Jan. 20, 2022

Related U.S. Application Data

(63) Continuation of application No. 15/921,002, filed on Mar. 14, 2018, now Pat. No. 11,157,865.

(60) Provisional application No. 62/471,454, filed on Mar. 15, 2017.

(51) Int. Cl.
| | |
|---|---|
| *G06Q 10/08* | (2012.01) |
| *G06Q 10/10* | (2012.01) |
| *G06Q 10/0833* | (2023.01) |
| *G06Q 10/1093* | (2023.01) |
| *G06K 7/14* | (2006.01) |

(52) U.S. Cl.
CPC ..... *G06Q 10/0833* (2013.01); *G06Q 10/1097* (2013.01); *G06K 7/1413* (2013.01); *G06K 7/1417* (2013.01)

(58) Field of Classification Search
CPC .............................. G06Q 10/08; G06Q 10/10
USPC ......................................................... 705/7.21
See application file for complete search history.

(56) References Cited

U.S. PATENT DOCUMENTS

| | | | |
|---|---|---|---|
| 4,344,368 | A | 8/1982 | Remington |
| 5,627,517 | A | 5/1997 | Theimer |
| 7,030,760 | B1 | 4/2006 | Brown |
| 7,034,683 | B2 | 4/2006 | Ghazarian |

(Continued)

FOREIGN PATENT DOCUMENTS

| | | |
|---|---|---|
| CN | 204642858 | 9/2015 |
| CN | 106494724 | 3/2017 |

(Continued)

OTHER PUBLICATIONS

PCT; App. No. PCT/US2018/042996; International Search Report and Written Opinion dated Dec. 3, 2018.

(Continued)

*Primary Examiner* — Nga B Nguyen
(74) *Attorney, Agent, or Firm* — Fitch, Even, Tabin & Flannery, LLP (57) ABSTRACT

In some embodiments, apparatuses and methods are provided herein useful to verify accuracy of a shipment. In some embodiments, items loaded to and/or unloaded from a delivery vehicle are scanned and compared to a delivery schedule, and a unique identifier is provided to confirm proper loading/unloading at a subsequent scheduled stop of the vehicle.

20 Claims, 4 Drawing Sheets

(56) References Cited

U.S. PATENT DOCUMENTS

| | | | |
|---|---|---|---|
| 7,039,496 | B2 | 5/2006 | Perez |
| 7,236,851 | B2 | 6/2007 | Charych |
| 7,684,994 | B2 | 3/2010 | Kodger, Jr. |
| 8,024,063 | B2 | 9/2011 | Redford |
| 9,323,967 | B2 | 4/2016 | Choi |
| 11,157,865 | B2 * | 10/2021 | Millhouse .......... G06Q 10/1097 |
| 2002/0053234 | A1 | 5/2002 | Leonard |
| 2002/0089434 | A1 * | 7/2002 | Ghazarian .............. G08B 13/06 340/988 |
| 2005/0071234 | A1 | 3/2005 | Schon |
| 2005/0185659 | A1 | 8/2005 | Sanderford, Jr. |
| 2006/0038077 | A1 | 2/2006 | Olin |
| 2006/0208890 | A1 * | 9/2006 | Ehrman ............. G08B 13/2402 340/572.1 |
| 2006/0229895 | A1 | 10/2006 | Kodger, Jr. |
| 2007/0126578 | A1 | 6/2007 | Broussard |
| 2007/0288294 | A1 | 12/2007 | Olsen, III |
| 2009/0160646 | A1 | 6/2009 | Mackenzie |
| 2009/0187272 | A1 | 7/2009 | Juan |
| 2010/0187022 | A1 | 7/2010 | Saigh |
| 2011/0156910 | A1 | 6/2011 | Pieper |
| 2012/0220282 | A1 | 8/2012 | Kwon |
| 2014/0156472 | A1 | 6/2014 | Stuntebeck |
| 2014/0317005 | A1 | 10/2014 | Balwani |
| 2014/0374478 | A1 | 12/2014 | Dearing |
| 2015/0193996 | A1 | 7/2015 | Van Wiemeersch |
| 2017/0083862 | A1 * | 3/2017 | Loubriel ............ G06Q 10/0835 |
| 2017/0341795 | A1 | 11/2017 | Colson |
| 2018/0020333 | A1 | 1/2018 | Gillen |
| 2018/0174093 | A1 | 6/2018 | Perez |

FOREIGN PATENT DOCUMENTS

| | | |
|---|---|---|
| CN | 106516350 | 3/2017 |
| CN | 106516352 | 3/2017 |

OTHER PUBLICATIONS

Syrjala, Sini, "Smart shelves"—The store shelf of the future, http://www.rfidarena.eom/2012/9/13/%E2%80%9Csmartshelves%E2%80%9Dthestoreshelfofthefuture.aspx, Jun. 13, 2016, 5 pp.

USPTO; U.S. Appl. No. 15/921,002; Notice of Allowance dated Jun. 24, 2021.

USPTO; U.S. Appl. No. 15/921,002; Office Action dated Apr. 9, 2021.

USPTO; U.S. Appl. No. 15/921,002; Office Action dated Sep. 25, 2020.

USPTO; U.S. Appl. No. 16/039,702; Office Action dated Jun. 1, 2020.

* cited by examiner

SHIPMENT VERIFICATION

CROSS-REFERENCE TO RELATED APPLICATION(S)

This application is a continuation of U.S. application Ser. No. 15/921,002, filed Mar. 14, 2018, which claims the benefit of U.S. Provisional Application No. 62/471,454, filed Mar. 15, 2017, each of which is incorporated by reference in its entirety herein.

TECHNICAL FIELD

This invention relates generally to systems and methods for shipping items along a route having one or more points at which items are unloaded, and more particularly to systems and methods for verifying the accuracy of shipments.

BACKGROUND

Multi-stop transportation of goods provides the ability to consolidate shipments and more efficiently transport unrelated goods bound for different destinations. However, it also provides opportunities for erroneous unloading of goods at the wrong stop or failure to properly load or re-load inventory. Goods that are erroneously unloaded and left at the wrong destination must be re-shipped using a different carrier, or in some cases destroyed, resulting in significant losses of time and money.

Many shipping systems have only simple electronic or paper load maps for multi-stop vehicle loads. This causes major issues when one retail location along a shipping route accidentally removes another retail location's freight and/or fails to take its own freight. As a result, inventory becomes inaccurate for at least two retail stores, and may result in destruction of the freight at a loss if the freight cannot be sold or re-shipped in a cost-effective manner.

Systems have been proposed which track goods or groups of goods with RFID tags or other traceable markers, to ensure that a truck or other vehicle is properly loaded before departing for its next destination. Such systems, however, can be relatively expensive and require installation of equipment to detect and track the markers. There remains a need for improved systems and methods for providing carriers with appropriate incentives to ensure that a vehicle has been properly unloaded and/or reloaded before departing from a given destination along a multi-stop route.

BRIEF DESCRIPTION OF THE DRAWINGS

Disclosed herein are embodiments of systems, apparatuses, and methods pertaining to verifying the accuracy of shipments by providing a unique identifier only when a shipment is properly loaded in a vehicle and any errors in loading or unloading the vehicle have been remedied. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to verify accuracy of a shipment by scanning items loaded to and/or unloaded from a delivery vehicle, comparing the scanned items to a delivery schedule or list of items to be included in the delivery, and providing a unique identifier to be applied to or associated with the vehicle that indicates to users at a subsequent scheduled stop of the vehicle that the prior loading or unloading operation was correctly performed. The identifier indicates to users at a subsequent scheduled stop of the vehicle that a prior unloading operation was correctly performed. The identifier may be a number, letter, symbol, color shape, UPC code, QR code, or any other detectable feature that distinguishes the identifier from other potential identifiers. The identifier may also be a combination of features. In some embodiments, the identifier may be on or part of a physical seal to be secured to the vehicle in a manner that evidences that the shipment has not been opened or tampered with. For instance, the seal may comprise a plastic or metal band looped around the door handles of a truck trailer and secured in a manner that requires destruction of at least a portion of the seal in order to remove the seal and open the trailer doors. Alternatively, the identifier may be attached to a physical seal or other device that evidences tampering or access to the delivery vehicle cargo area. In some embodiments the identifier may be selected from a plurality of different pre-generated, non-sequential identifiers so that the identifier can be selected at the loading/unloading site upon confirmation of proper vehicle loading without any way to know the identifier ahead of time. In other embodiments, the identifier may be physically generated on-site. In still other embodiments, the identifier may be stored on an electronic storage medium, such as a flash memory device or other non-volatile memory, incorporated into a seal or other device, and may be stored in a blockchain ledger or otherwise encrypted to securely store the data on the electronic storage medium. In some embodiments, information regarding the identifier is forwarded to the next destination so that the information can be compared to the identifier on the vehicle to confirm that the shipment was properly loaded and not subsequently tampered with.

While the identifier will be described herein with respect to its application to or association with a vehicle, the inventions are equally applicable to components of vehicles; cargo structures placed on, placed in, carried by, or pulled by vehicles; individual storage containers; or any other structure that is used to convey goods from one location to another. Vehicles and related structures that may be used in connection with the invention include, but are not limited to, cars, trucks, tractor/trailer combinations, trains, boats, helicopters, airplanes, aerial drones, autonomous ground vehicles, ISO containers, boxes, cases, carts, and pallets.

In some embodiments, an identifier may be physically generated on-site at the loading area when proper loading/unloading is confirmed. For instance, a paper or plastic tag may be printed for attachment to a physical seal. In some embodiments, the seal itself or a portion thereof may be generated on demand, for instance by 3-D printing, only when proper loading of cargo is confirmed. In some embodiments, a printer may be configured to generate one or more mating portions of the seal only upon confirmation that the cargo has been properly loaded, preventing the seal from being applied to the vehicle unless scanning of items indicates that all items scheduled to be unloaded have been moved to the unloading dock and all items scheduled for subsequent destinations are within the vehicle. In some embodiments, a device may be configured to modify a seal blank by adding material, cutting, embossing, piercing, or other methods to create a functional seal upon confirmation of proper loading/unloading.

In some embodiments, the identifier is an electronic code or data that may be uploaded to a memory device incorporated into a seal or otherwise accompanying a vehicle. The memory device may be in some embodiments a flash memory device or other non-volatile memory, and in some embodiments may be incorporated into a seal or other tamper-evident device. In some forms, the memory device includes a wireless transceiver in order to receive and transmit information wirelessly, allowing users to upload an identifier to the memory device at a first location using a wireless signal (such as Bluetooth) and read or access the identifier wirelessly at a second location. In some embodiments, blockchain technology may be utilized to record the identifier and/or other shipping, loading, and delivery information. Memory devices described herein may comprise a node in a distributed blockchain system storing a copy of the blockchain record, with updates to the blockchain at points along a shipping route.

As used herein, a blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

In some embodiments, a system comprises an electronic scheduling device configured to receive a delivery schedule listing all items aboard a vehicle to be unloaded at a first delivery location, a scanning device for scanning identification tags located on items to be unloaded from the vehicle as they are unloaded, a control circuit coupled to the electronic scheduling device and the scanning device, the control circuit configured to compare information from scanned identification tags to the delivery schedule and further configured to generate an alert for each scanned identification tag not on the delivery schedule and for each item on the delivery schedule not scanned, and an output device for providing an identifier only if the control circuit indicates that there are no alerts or that each alert has been remedied. The identifier may be configured to be physically applied to the vehicle and indicate to users at a subsequent scheduled stop of the vehicle that a prior unloading operation was correctly performed.

In other embodiments, a method for verifying accuracy of a shipment includes receiving a vehicle at a loading/unloading station, receiving at an electronic scheduling device a delivery schedule, unloading one or more items from the vehicle, scanning an identification tag of each unloaded item with an electronic scanning device, comparing each scanned identification tag to the delivery schedule, generating an alert for each unloaded item not on the delivery schedule and for each item on the delivery schedule not unloaded from the vehicle, and providing an identifier for the vehicle only if there are no alerts or if each alert is remedied. The steps of the method may be repeated at multiple points along a delivery path.

In some embodiments, an apparatus is provided for performing the steps of receiving a vehicle at a loading/unloading station, receiving at an electronic scheduling device a delivery schedule, unloading one or more of items from the vehicle, scanning an identification tag of each unloaded item with an electronic scanning device, comparing each scanned identification tag to the delivery schedule, generating an alert for each unloaded item not on the delivery schedule and for each item on the delivery schedule not unloaded from the vehicle, providing an identifier to be physically applied to the vehicle only if there are no alerts or if each alert is remedied, applying a physical seal bearing the identifier to a cargo area of the vehicle after securing the cargo area, electronically transmitting the identifier to a second delivery location, receiving the vehicle at the second delivery location, receiving at a second scheduling device located at the second delivery location a delivery schedule listing all items aboard the vehicle to be unloaded at the second delivery location, scanning the physical seal on the vehicle and verifying that the physical seal matches the selected identifier that was electronically transmitted to the second delivery location, unloading a second group of one or more of the items from the vehicle, scanning the identification tag of each unloaded item from the second group with a second scanning device, comparing each scanned identification tag to the second delivery schedule, and generating an alert for each item unloaded at the second delivery location that is not on the second delivery schedule and for each item on the second delivery schedule not unloaded at the second delivery location.

Figure 1:
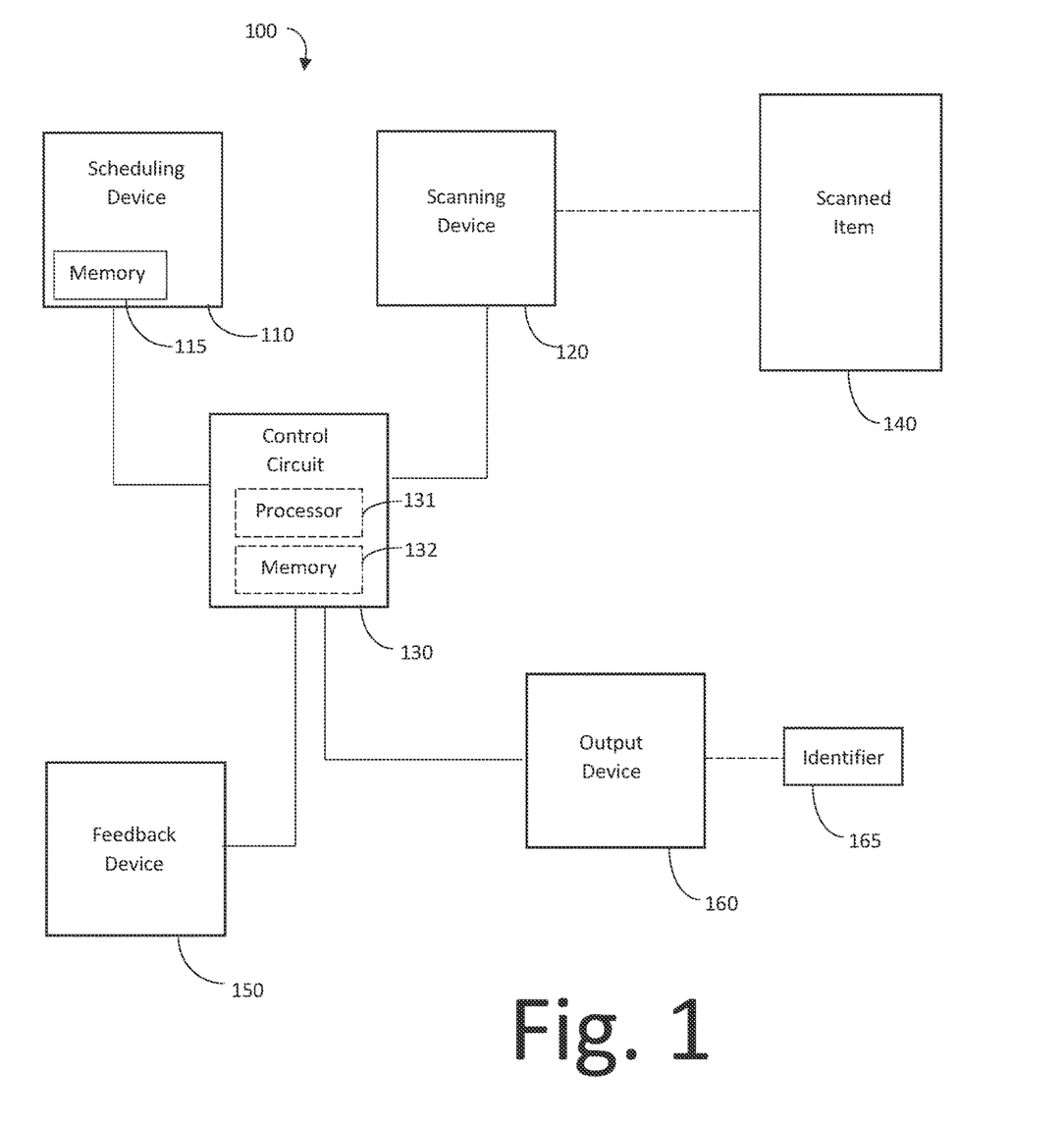
FIG. 1 is a diagram of a system for verifying correct loading and unloading of items in accordance with some embodiments.

The exemplary system for verifying accuracy of shipments shown in FIG. 1 includes a scheduling device 110 and a scanning device 120 for scanning items unloaded from the vehicle, and in some embodiments also for scanning items aboard the vehicle. The scheduling device 110 includes a memory 115 for storing a shipping schedule. The shipping schedule may be transmitted to the scheduling device from a remote source, manually input into the scheduling device, made available to the scheduling device on a server or via the internet, accessed by or copied to the scheduling device from a physical medium, or provided to the scheduling device in any other known manner.

In some forms, the scanning device may be an optical sensor for reading UPC or QR codes, an RFID reader, or any other device capable of recognizing uniquely identified shipped items. The scanning device may be static or mobile. In some embodiments the scanning device is automated, while in others is user-operated and may be a hand-held device. The scanning device may be used to recognize individual tagged items, groups or bundles of items, or pallets or containers used to transport items. The scanning device may be separate from the electronic scheduling device, which includes a computer memory and is configured to receive and store one or more delivery schedules listing items aboard vehicles received at a delivery location and information regarding the scheduled destination for each such item. Alternatively, the scanning device and scheduling device may be integrated into a single device.

The scanning device and scheduling device are both coupled to a control circuit 130. The term control circuit refers broadly to any microcontroller, computer, or processor-based device with processor, memory, and programmable input/output peripherals, which is generally designed to govern the operation of other components and devices. It is further understood to include common accompanying accessory devices. The control circuit can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the control circuit may provide multiprocessor functionality. These architectural options are well known and understood in the art and require no further description here. The control circuit 130 may be configured (for example, by using corresponding programming stored in a memory as will be well understood by those skilled in the art) to carry out one or more of the steps, actions, and/or functions described herein.

Generally, the control circuit 130 and/or electronic components of the scanning device 120 and scheduling device 110 can include fixed-purpose hard-wired platforms or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein, and can store instructions, code, and the like that is implemented by the control circuit and/or processors to implement intended functionality. In some applications, the control circuit and/or memory may be distributed over a communications network (e.g. LAN, WAN, Internet) providing distributed and/or redundant processing and functionality. In some implementations, the control circuit 130 can comprise a processor 131 and a memory (such as memory 132 or a separate computer memory) may be integrated together, such as in a microcontroller, application specification integrated circuit, field programmable gate array or other such device, or may be separate devices coupled together. Where the control circuit 130 is integrated into the scheduling device 110, a single computer memory module may function for both memory 115 and memory 132.

The scanning device 120 scans information from an item 140 unloaded from a truck and conveys that information to the control circuit 130. The control circuit 130 compares the scanned information to scheduling information from the scheduling device 110. If there is a discrepancy between the scheduling information and the scanned information, the control circuit 130 will deliver an alert via a feedback mechanism or device 150, which may be integrated with the scheduling device 110 and/or scanning device 120 or a separate module. The alert may be, for instance, an audio and/or visual signal, such as an audio tone, audible words, warning light, visual symbol, or written text indicative of or explaining the discrepancy. The feedback device 150 may comprise a speaker, display, or any other device for conveying information to a user.

If all scanned items at a delivery stop match the scheduling information received by the scheduling device 110, and there are no items listed on the schedule that were not scanned, the control circuit will signal an output device 160 to generate, select, or modify an identifier 165 to be affixed to the delivery vehicle to show that the delivery has been accurately completed. In some embodiments, the output device may select the identifier from a plurality of identifiers corresponding to physical seals present at the delivery location. For instance, a number of pre-made seals with known identifiers may be present with the output device 160 selecting one of the identifiers at random from a database. In some embodiments, the selected identifier 165 may be removed from the list of potential identifiers in order to prevent subsequent duplication of identifiers. In some other embodiments, the output device 160 may print or engrave a random identifier 165 on a physical seal or seal component at the delivery location. In some embodiments, the output device may print an identifier on paper or other substrate to be attached to a seal. In other embodiments, the output device may encode the identifier 165 on a memory device of the seal. In some embodiments, the output device may also generate the physical seal itself, such as by printing the seal or a portion thereof from a 3-D printer or by cutting the seal from a sheet of plastic. In some embodiments, the control circuit will transmit information about the identifier 165 to the next delivery location for comparison to the physical seal applied to the vehicle. In other embodiments, the attachment of the identifier to the vehicle will verify proper loading/unloading, such as where a seal is manufactured or modified in order to make it functional.

Figure 2A:
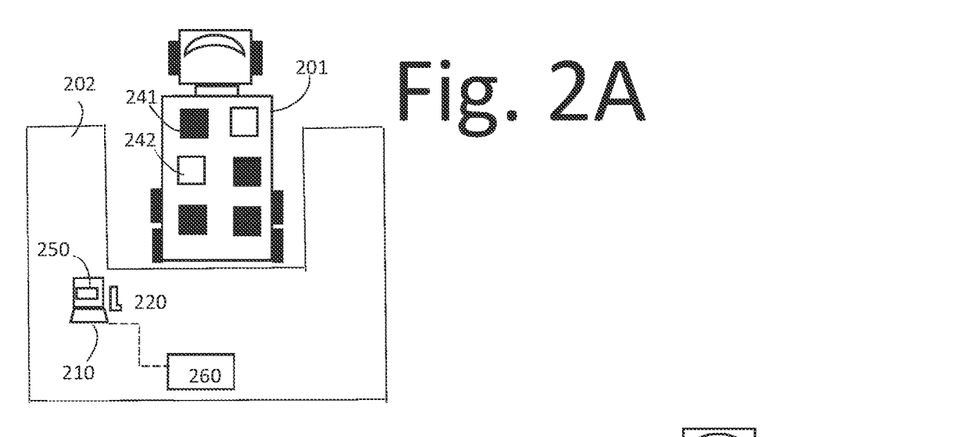
FIG. 2A is an overhead view of a truck docked at a delivery location in accordance with several embodiments.
Figure 2B:
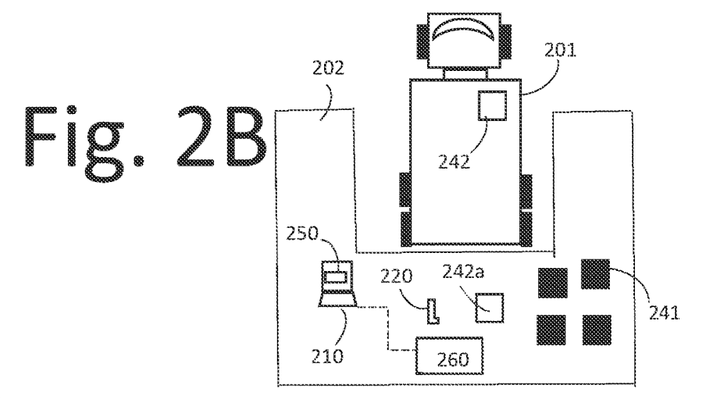
FIG. 2B is an overhead view of the truck from FIG. 2A with multiple items unloaded in accordance with some embodiments.
Figure 2C:
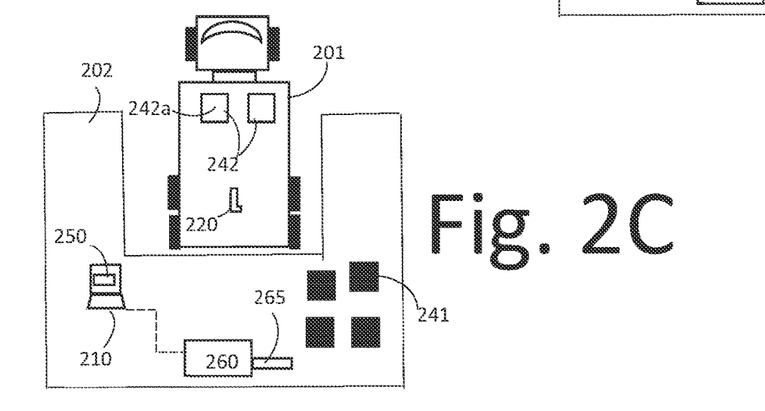
FIG. 2C is the truck from FIGS. 2A and 2B with all items bound for a subsequent destination properly loaded in the truck in accordance with several embodiments.

In the example shown in FIGS. 2A-2C, a truck 201 is shown parked at an unloading dock 202. A group of first pallets 241 carrying goods to be dropped off at the loading dock 202 are shown with shaded boxes, while a group of second pallets 242 shown as unshaded boxes are carrying goods scheduled to be delivered to a later destination along the truck's route. A scheduling device 210 in the form of a computer is located at the unloading dock 202. In FIG. 2B, several pallets have been unloaded, including four scheduled to be unloaded at doc 202 and one pallet 242a bound for a later destination, which was removed to allow unloading of all of the first pallets 241. A scanning device 220 is used to scan all of the pallets unloaded at dock 202, and transmits information regarding the unloaded pallets to a scheduling device 210. The scheduling computer contains information regarding the pallets from truck 201, indicating which pallets are scheduled for delivery to dock 202 and which pallets are scheduled for delivery to other destinations. After the scanning device scans erroneously unloaded pallet 242a, an error message is displayed on the screen 250 of the computer 210. Output device 260 will not provide a truck seal with a unique identifier until the event giving rise to the error message is corrected. In FIG. 2C, improperly unloaded pallet 242a has been reloaded into the truck. Scanning device 220 detects that pallet 242a is now on board the truck 201, and sends a signal to the scheduling device 210 to confirm this placement. The scheduling device 210 compares the revised information regarding pallet 242a to scheduling information stored in a database, and confirms that all pallets are now properly loaded. Computer 210 then sends a signal to the output device 260, causing it to generate a seal 265 that may be placed on the truck 201 to verify that the truck was properly unloaded and reloaded at dock 202. The computer 210 also sends information regarding this seal to the next destination on the route of the truck 201 so that systems at that location may verify that the proper seal remains in place upon arrival.

Figure 3:
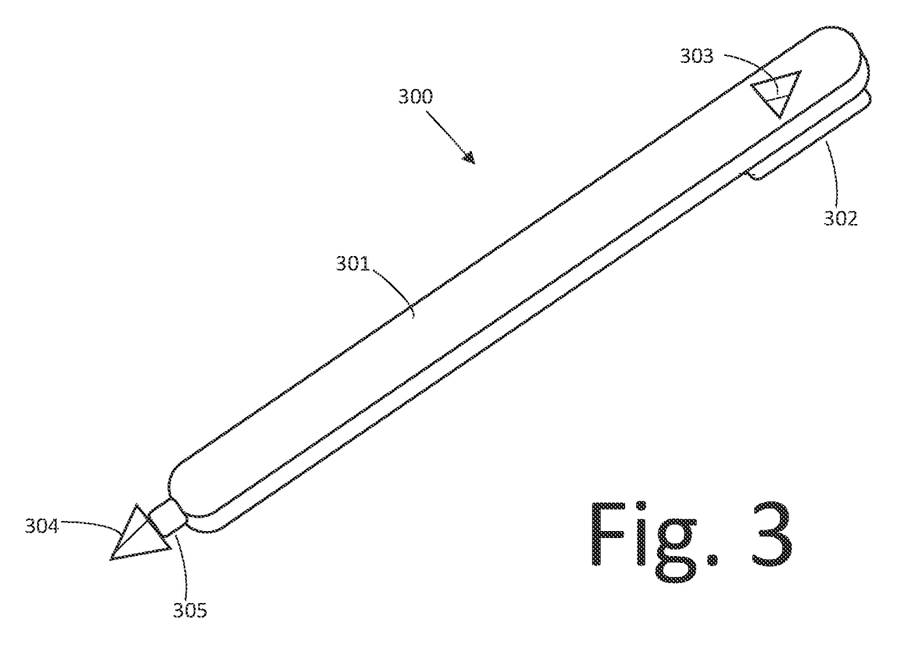
FIG. 3 is a tamper resistant seal in accordance with some embodiments.

FIG. 3 shows one example of a truck seal 300 for use with some embodiments. The seal may be made of a durable material such as plastic or metal. The seal 300 includes a seal body 301, a receiver 302 containing an opening 303, and a locking end 304. In use the seal 300 is wrapped around door handles of adjacent doors and secured by placing the locking end 304 through the opening 303 in the receiver 302. Due to the shape of the locking end 304 and the corresponding shape of the opening 303, the locking end may pass through the opening 303 in one direction, but the ramp-shaped structure of the locking end 304 prevents it from being pulled through the opening 303 in the opposite direction, resulting in a snap-lock connection. Placing significant stress on the seal 300 while attempting to pull the locking end 304 back through the opening 303 in a reverse direction will cause the thin neck portion 305 connecting the locking end 304 to the body 301 to break, providing evidence of tampering and indicating that the contents of the trailer may have been disturbed. An identifier may be engraved on the body portion 301 upon certain process steps having been fulfilled. Alternatively, or in addition, the seal itself may function as an identifier. For instance, seals may be provided as blanks so that specific locking end and/or receptacle opening features may be formed in the blank by addition or subtraction of material in order to provide a functional seal capable of locking. For instance, in some embodiments upon completion of proper loading or unloading, an output device may be directed to 3-D print a locking end 304 that matches the opening 303 at the opposite end. Alternatively, the locking end in some embodiments could be formed by carving an end of a seal blank in order to form a locking end with a shape able to pass in one direction through the opening at the opposite end of the seal.

Figure 4:
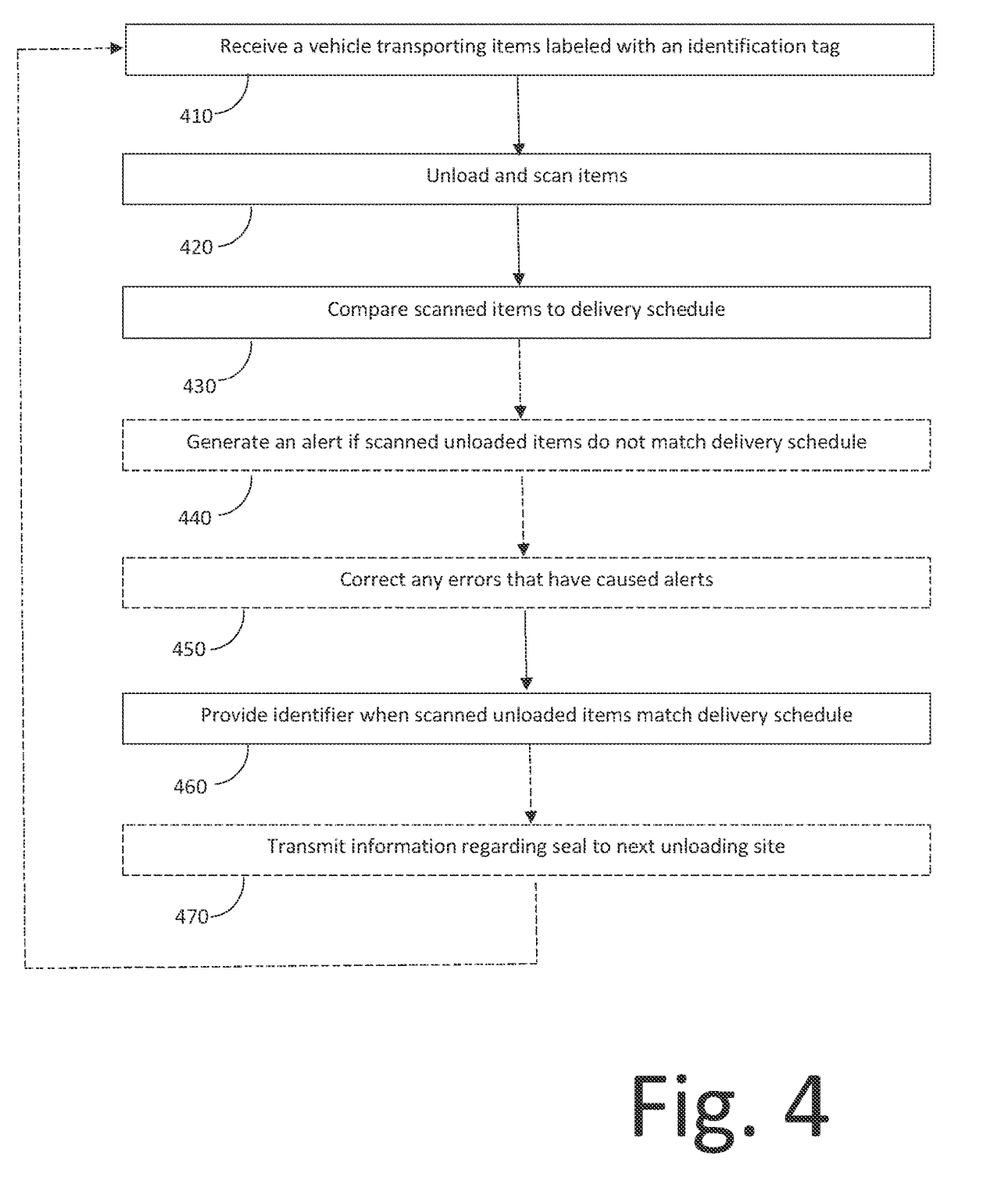
FIG. 4 is a flow diagram of a method for verifying correct loading and unloading of a vehicle in accordance with some embodiments.

FIG. 4 is a flow diagram illustrating steps of a method in accordance with some embodiments of the invention. A vehicle, for example a truck, train, boat, helicopter, or airplane, is received at an unloading location (Step 410). The vehicle is transporting various items labeled with identification tags. The identification tags may be affixed to individual items or groups of items (such as by affixing an identification tag to a pallet or container holding a collection of goods). Items scheduled for delivery at that location are unloaded from the vehicle and scanned (Step 420). The identity of the scanned items is compared to a delivery schedule (Step 430). The delivery schedule may be stored in a database locally, remotely, or on a cloud-based system. If there is a discrepancy between the status of the scanned items and the delivery schedule, for instance if an item that has been unloaded and scanned does not appear on the delivery schedule as scheduled for delivery to the current site or an item scheduled for delivery has not been scanned, the system will generate an alert indicating to users that the items have not been properly unloaded (Step 440). If necessary, users may then correct any discrepancies that caused generation of the alert(s), such as by loading any items improperly unloaded back onto the vehicle and unloading any items erroneously left on the vehicle (Step 450). When it is confirmed that the unloaded items match the delivery schedule, an identifier is provided (Step 460) that the driver of the vehicle can present at the next stop to confirm that the vehicle was properly unloaded of freight at a particular site. In some embodiments the identifier may be a symbol, or in some embodiments may be a configuration of a physical object, for instance a shape of a portion of a seal that is necessary to allow the seal to be secured to the vehicle. Information regarding the identifier may be optionally transmitted to the next unloading site (Step 470), such as by sending message containing the information to a device at the next unloading site or making the information available at a location accessible to the next unloading site. The steps of the process shown in FIG. 4 may then be repeated at the next unloading site if desired.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for verifying accuracy of a shipment comprising:
   an electronic scheduling device including a memory configured to store a delivery schedule listing all items aboard a vehicle to be unloaded at a delivery location;
   an electronic scanning device for scanning identification tags located on items to be unloaded from the vehicle as they are unloaded;

a control circuit coupled to the electronic scheduling device and the electronic scanning device, the control circuit including a programmable processor and configured to compare information from the identification tags scanned by the electronic scanning device to the delivery schedule stored in the memory of the electronic scheduling device to verify that correct items were unloaded from the vehicle;

an output device configured to, only if the control circuit verifies that the correct items were unloaded from the vehicle, generate an identifier to be physically applied to a physical seal configured to interconnect handles of doors that provide access to a cargo area of the vehicle, and at least one of:

apply the identifier generated by the output device to the physical seal configured to interconnect the handles of the doors that provide access to the cargo area of vehicle to indicate to users at a subsequent scheduled stop of the vehicle that a prior unloading operation of the items from the vehicle was correctly performed;

encode the identifier generated by the output device onto a memory device of the physical seal; and print the identifier generated by the output device on a substrate configured to be attached to the physical seal.

2. The system of claim 1, wherein the scheduling device and scanning device are integrated into a single device.

3. The system of claim 1, wherein the control circuit is configured to generate an alert when the control circuit is unable to verify that the correct items were unloaded from the vehicle.

4. The system of claim 3, wherein the control circuit is configured to verify that the alert has been remedied.

5. The system of claim 1, wherein the output device is configured to store the identifier in a blockchain ledger on a non-volatile memory device.

6. The system of claim 1, wherein the identifier comprises a number, letter, symbol, color, shape, UPC code, QR code, or combination thereof.

7. The system of claim 1, wherein the output device is configured to select the identifier from a plurality of identifiers corresponding to physical seals present at the delivery location.

8. The system of claim 1, wherein the output device is configured to engrave the identifier on the physical seal at the delivery location.

9. The system of claim 1, wherein the output device is configured to generate a physical seal bearing the identifier.

10. The system of claim 9, wherein the output device is configured to form at least a portion of the physical seal using a 3-D printer at the delivery location.

11. A method of verifying accuracy of a shipment, the method comprising:

providing an electronic scheduling device including a memory configured to store a delivery schedule listing all items aboard a vehicle to be unloaded at a delivery location;

providing an electronic scanning device for scanning identification tags located on items to be unloaded from the vehicle as they are unloaded;

providing a control circuit coupled to the electronic scheduling device and the electronic scanning device, the control circuit including a programmable processor and configured to compare information from the identification tags scanned by the electronic scanning device to the delivery schedule stored in the memory of the electronic scheduling device to verify that correct items were unloaded from the vehicle;

providing an output device configured to, only if the control circuit verifies that the correct items were unloaded from the vehicle, generate an identifier to be physically applied to a physical seal configured to interconnect handles of doors that provide access to a cargo area of the vehicle, and at least one of:

apply the identifier generated by the output device to the physical seal configured to interconnect the handles of the doors that provide access to the cargo area of vehicle to indicate to users at a subsequent scheduled stop of the vehicle that a prior unloading operation of the items from the vehicle was correctly performed;

encode the identifier generated by the output device onto a memory device of the physical seal; and print the identifier generated by the output device on a substrate configured to be attached to the physical seal.

12. The method of claim 11, wherein the scheduling device and scanning device are integrated into a single device.

13. The method of claim 11, further comprising generating alert via the control circuit when the control circuit is unable to verify that the correct items were unloaded from the vehicle.

14. The method of claim 13, further comprising verifying, via the control circuit, that the alert has been remedied.

15. The method of claim 11, further comprising storing the identifier in a blockchain ledger on a non-volatile memory device.

16. The method of claim 11, wherein the identifier comprises a number, letter, symbol, color, shape, UPC code, QR code, or combination thereof.

17. The method of claim 11, further comprising selecting, via the output device, the identifier from a plurality of identifiers corresponding to physical seals present at the delivery location.

18. The method of claim 11, further comprising engraving, via the output device, the identifier on the physical seal at the delivery location.

19. The method of claim 11, further comprising generating, via the output device, a physical seal bearing the identifier.

20. The method of claim 19, further comprising forming, via the output device, at least a portion of the physical seal using a 3-D printer at the delivery location.

* * * * *